US010320052B2

(12) United States Patent
Khan et al.

(10) Patent No.: US 10,320,052 B2
(45) Date of Patent: Jun. 11, 2019

(54) WIRELESS DEVICE WITH FLEXIBLE NECK

(71) Applicant: Phazr, Inc., Allen, TX (US)

(72) Inventors: Farooq Khan, Allen, TX (US); Jignesh Patel, Plano, TX (US)

(73) Assignee: Phazr, Inc., Allen, TX (US)

( * ) Notice: Subject to any disclaimer, the term of this patent is extended or adjusted under 35 U.S.C. 154(b) by 90 days.

(21) Appl. No.: 15/809,593

(22) Filed: Nov. 10, 2017

(65) Prior Publication Data

US 2019/0148812 A1 May 16, 2019

(51) Int. Cl.

*H04W 88/08* (2009.01)
*H01Q 1/08* (2006.01)
*H01Q 1/14* (2006.01)
*H01Q 1/12* (2006.01)
*H04W 88/00* (2009.01)

(52) U.S. Cl.

CPC .......... *H01Q 1/085* (2013.01); *H01Q 1/1207* (2013.01); *H01Q 1/14* (2013.01)

(58) Field of Classification Search

CPC .......... H04J 14/0267; H04J 2203/0023; H04J 2203/0053; H04W 84/17; H04W 88/00; H04W 88/08; H01Q 1/14

USPC .......................................... 455/507; 307/351

See application file for complete search history.

(56) References Cited

U.S. PATENT DOCUMENTS 5,909,194 A * 6/1999 Umeda .................. H01Q 1/244 343/702
6,160,477 A * 12/2000 Sandelman ......... G06F 11/0748 340/506
6,211,782 B1 * 4/2001 Sandelman ......... G06F 11/0748 340/506
6,421,539 B1 * 7/2002 Jeong .................... H04W 60/04 455/433
6,759,971 B2 * 7/2004 Lumbis ............... B61L 15/0036 246/167 R
6,980,127 B2 * 12/2005 Lumbis ............... B61L 15/0036 246/1 R
7,149,197 B2 * 12/2006 Garahi .................. H04W 88/02 370/328
7,920,663 B1 * 4/2011 Stevens ................... H03L 7/085 331/1 R
7,924,813 B1 * 4/2011 Gerszberg ........... H04M 1/2478 348/14.08
8,130,169 B2 * 3/2012 Chou ....................... H01Q 1/38 343/905
8,194,585 B2 * 6/2012 Hahn .................. H04B 7/2606 370/315
8,287,434 B2 * 10/2012 Zavadsky ............. A63B 21/00 482/1
8,326,221 B2 * 12/2012 Dorsey .................. G06Q 10/02 455/41.1

(Continued)

*Primary Examiner* — Hai V Nguyen
(74) *Attorney, Agent, or Firm* — Michael A. Rahman

(57) ABSTRACT

A wireless device includes a broadband router comprising first and second transceivers, a base and a flexible neck having an elongated body and a first end connected to the broadband router and a second end connected to the base. The flexible neck bends and twists with ease. The flexible neck supports and retains the broadband router in a selected position in relation to the base. The flexible neck provides a pathway for electrically connecting the broadband router to the base to supply electrical power to the broadband router.

31 Claims, 5 Drawing Sheets

(56) References Cited

U.S. PATENT DOCUMENTS 8,344,955 B2* 1/2013 Niemi .................... H01Q 1/243 343/702
8,386,202 B2* 2/2013 Aisa ......................... H04B 3/54 324/76.11
8,527,003 B2* 9/2013 Gupta .................. H01Q 1/2291 348/384.1
8,588,830 B2* 11/2013 Myer ........................ F21S 2/00 455/507
8,670,356 B1* 3/2014 Keese .................. H04B 1/0064 370/277
8,818,269 B2* 8/2014 Dorsey .................. G06Q 10/02 455/41.1
8,917,308 B2* 12/2014 Kaltsukis ......... G08B 13/19695 348/14.02
9,094,073 B2* 7/2015 Takano ................ H04B 7/0617
9,343,817 B2* 5/2016 Pan ........................ H01Q 21/20
9,345,038 B2* 5/2016 Derham ................. H04B 7/043
9,355,590 B2* 5/2016 Lee ...................... G09G 3/3208
9,482,820 B1* 11/2016 Barwicz ................... G02B 6/30
9,699,788 B2* 7/2017 Takano ................ H04B 7/0617
9,921,559 B2* 3/2018 Tsubota ................. G05B 19/00
9,930,558 B2* 3/2018 Sahin .................... H04W 16/14
10,079,437 B2* 9/2018 Chen ...................... H01Q 21/08
10,177,464 B2* 1/2019 Moosbrugger ........ H01Q 21/24
10,194,327 B1* 1/2019 Khan .................... H04W 16/14
2003/0035437 A1* 2/2003 Garahi .................. H04W 88/02 370/465
2003/0038711 A1* 2/2003 Lumbis ............... B61L 15/0036 303/7
2004/0207521 A1* 10/2004 Lumbis ............... B61L 15/0036 340/514
2005/0036622 A1* 2/2005 Hay .................... H04L 63/0428 380/270
2006/0215592 A1* 9/2006 Tomoe .................... H04L 45/00 370/315
2007/0121648 A1* 5/2007 Hahn ....................... H04B 1/18 370/401
2007/0183377 A1* 8/2007 Hoole ................... H04W 92/12 370/338
2007/0183378 A1* 8/2007 Passarella ............... H04L 47/10 370/338
2007/0183423 A1* 8/2007 Passarella ......... H04L 29/06027 370/392
2007/0186108 A1* 8/2007 Passarella ........... H04L 61/2015 713/171
2008/0002652 A1* 1/2008 Gupta .................. H01Q 1/2291 370/338
2008/0151986 A1* 6/2008 Patton ............... H01L 25/03019 375/231
2008/0155052 A1* 6/2008 Ramesh ................ H04L 43/026 709/217
2009/0017889 A1* 1/2009 Zhukov ............... A63F 3/00643 463/14
2009/0129273 A1* 5/2009 Zou ......................... H04L 45/70 370/235
2009/0309806 A1* 12/2009 Chou ....................... H01Q 1/38 343/905
2010/0020741 A1* 1/2010 Hahn ................... H04B 7/2606 370/315
2010/0173661 A1* 7/2010 Miyazaki ................ H04L 63/08 455/507
2010/0203833 A1* 8/2010 Dorsey .................. G06Q 10/02 455/41.2
2010/0332164 A1* 12/2010 Aisa ......................... H04B 3/54 702/62
2011/0102281 A1* 5/2011 Su ............................ H01Q 1/36 343/742
2011/0151810 A1* 6/2011 Su .......................... H01Q 3/242 455/126
2011/0169698 A1* 7/2011 Niemi .................... H01Q 1/085 343/702
2011/0177836 A1* 7/2011 Iwata .................... H04W 36/30 455/507
2011/0249125 A1* 10/2011 Wallack ................. A61B 8/565 348/163
2011/0251021 A1* 10/2011 Zavadsky ............. A63B 21/00 482/5
2012/0008611 A1* 1/2012 Talley ................... H04W 88/10 370/338
2012/0122392 A1* 5/2012 Morioka ............. H04B 7/0695 455/25
2013/0065680 A1* 3/2013 Zavadsky ............. A63B 21/00 463/30
2013/0173315 A1* 7/2013 Dorsey .................. G06Q 10/02 705/5
2013/0273956 A1* 10/2013 Gallagher ............ H04W 16/02 455/509
2014/0056263 A1* 2/2014 Takano ................ H04B 7/0617 370/329
2014/0071018 A1* 3/2014 Pan ........................ H01Q 21/20 343/867
2014/0145879 A1* 5/2014 Pan ........................ H01Q 21/20 342/371
2015/0235593 A1* 8/2015 Lee ...................... G09G 3/3208 345/698
2015/0282153 A1* 10/2015 Takano ................ H04B 7/0617 370/329
2015/0382171 A1* 12/2015 Roy ...................... H04W 48/16 370/329
2015/0382275 A1* 12/2015 Pragada ................ H04W 40/12 370/236
2016/0029403 A1* 1/2016 Roy .................. H04W 72/0406 370/336
2016/0156425 A1* 6/2016 Katayama ............ H04B 17/345 455/67.13
2016/0286169 A1* 9/2016 Sannala ................. H01Q 21/28
2016/0329632 A1* 11/2016 Caratelli .................. H01Q 1/48
2016/0330643 A1* 11/2016 Sahin .................... H04W 16/14
2016/0351114 A1* 12/2016 Lee ........................ G04G 21/02
2017/0008162 A1* 1/2017 Tsubota ................. G05B 19/00
2018/0007673 A1* 1/2018 Fwu ........................ H04W 4/70
2018/0109282 A1* 4/2018 Khan ........................ H04B 1/40
2018/0167228 A1* 6/2018 Elcock ................ H04L 12/2823
2018/0167927 A1* 6/2018 Beattie, Jr. ............ H04W 4/029

* cited by examiner

WIRELESS DEVICE WITH FLEXIBLE NECK

BACKGROUND

The invention relates to wireless communications, and in particular relates to a wireless device with a flexible neck.

DESCRIPTION OF THE RELATED ART

Currently, wireless access methods are based on two popular standards: a wide area network (WAN) standard referred to as The Fourth Generation Long Term Evolution (4G LTE) system; and a local area network (LAN) standard called Wi-Fi. Wi-Fi is generally used indoors as a short-range wireless extension of wired broadband systems, whereas the 4G LTE systems provide wide area long-range connectivity both outdoors and indoors using dedicated infrastructure such as cell towers and backhaul to connect to the Internet.

As more people connect to the Internet, increasingly chat with friends and family, watch and upload videos, listen to streamed music, and indulge in virtual or augmented reality, data traffic continues to grow exponentially. In order to address the continuously growing wireless capacity challenge, the next generation of LAN and WAN systems are relying on higher frequencies referred to as millimeter waves in addition to currently used frequency bands below 7 GHz. The next generation of wireless WAN standard referred to as 5G New Radio (NR) is under development in the Third Generation Partnership Project (3GPP). The 3GPP NR standard supports both sub-7 GHz frequencies as well as millimeter wave bands above 24 GHz. In 3GPP standard, frequency range 1 (FR1) covers frequencies in the 0.4 GHz-6 GHz range. Frequency range 2 (FR2) covers frequencies in the 24.25 GHz-52.6 GHz range. Table 1 provides examples of millimeter wave bands including FR2 bands that may be used for wireless high data-rate communications.

TABLE 1

Examples of millimeter wave bands

| Bands [GHz] | Frequency [GHz] | Bandwidth [GHz] |
|---|---|---|
| 26 GHz Band | 24.25-27.5 | 3.250 |
| LMDS Band | 27.5-28.35 | 0.850 |
| | 29.1-29.25 | 0.150 |
| | 31-31.3 | 0.300 |
| 32 GHz Band | 31.8-33.4 | 1.600 |
| 39 GHz Band | 38.6-40 | 1.400 |
| 37/42 GHz Bands | 37.0-38.6 | 1.600 |
| | 42.0-42.5 | 0.500 |
| 60 GHz | 57-64 | 7.000 |
| | 64-71 | 7.000 |
| 70/80 GHz | 71-76 | 5.000 |
| | 81-86 | 5.000 |
| 90 GHz | 92-94 | 2.900 |
| | 94.1-95.0 | |
| 95 GHz | 95-100 | 5.000 |
| 105 GHz | 102-105 | 7.500 |
| | 105-109.5 | |
| 112 GHz | 111.8-114.25 | 2.450 |
| 122 GHz | 122.25-123 | 0.750 |
| 130 GHz | 130-134 | 4.000 |
| 140 GHz | 141-148.5 | 7.500 |
| 150/160 GHz | 151.5-155.5 | 12.50 |
| | 155.5-158.5 | |
| | 158.5-164 | |

Table 2 lists examples of FR1 bands in the 3GPP standard. We refer to the FR1 bands in the 3GPP standard, unlicensed 2.4 GHz and 5 GHz bands, 5.925-6.425 GHz and 6.425-7.125 GHz bands and any other spectrum band below 7 GHz as sub-7 GHz spectrum.

TABLE 2

Examples of FR1 bands in 3GPP

| 5G-RAN Frequency Band | Uplink Frequency band | Downlink Frequency band | Duplex Mode |
|---|---|---|---|
| n1 | 1920 MHz-1980 MHz | 2110 MHz-2170 MHz | FDD |
| n3 | 1710 MHz-1785 MHz | 1805 MHz-1880 MHz | FDD |
| n7 | 2500 MHz-2570 MHz | 2620 MHz-2690 MHz | FDD |
| n8 | 880 MHz-915 MHz | 925 MHz-960 MHz | FDD |
| n20 | 832 MHz-862 MHz | 791 MHz-821 MHz | FDD |
| n28 | 703 MHz-748 MHz | 758 MHz-803 MHz | FDD |
| n41 | 2496 MHz-2690 MHz | 2496 MHz-2690 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n77 | 3300 MHz-4200 MHz | N/A | TDD |
| n78 | 3300 MHz-3800 MHz | N/A | TDD |
| n79 | 4400 MHz-5000 MHz | N/A | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |

In addition to serving the mobile devices, the next generation of wireless WAN systems using millimeter wave and sub-7 GHz spectrum is expected to provide high-speed (Gigabits per second) links to fixed wireless broadband routers installed in homes and commercial buildings.

SUMMARY

According to disclosed embodiments, a broadband wireless device comprises a broadband router comprising first and second transceivers, a base and a flexible neck having an elongated body and a first end connected to the broadband router and a second end connected to the base. The flexible neck bends and twists with ease. The flexible neck supports and retains the broadband router in a selected position in relation to the base. The flexible neck provides a pathway for electrically connecting the broadband router to the base to supply electrical power to the broadband router.

According to some disclosed embodiments, the flexible neck provides a pathway for a cable to transfer data signals between the base and the broadband router. In some embodiments, the flexible elongated neck may provide a pathway for an ethernet cable to supply electrical power to the broadband router and to transfer data signals between the broadband router and the base.

According to some disclosed embodiments, the first transceiver is configured to receive millimeter wave band downlink signals from a radio base station and to transmit sub-7 GHz band uplink signals to the radio base station.

According to some disclosed embodiments, the first transceiver is configured to receive millimeter wave band downlink signals from the radio base station and to transmit millimeter wave band uplink signals to the radio base station.

According to some disclosed embodiments, the second transceiver is configured to receive sub-7 GHz band signals from a communication device and to transmit sub-7 GHz band signals to the communication device.

According to some disclosed embodiments, the flexible neck has a plurality of parallel grooves formed laterally about the outer surface of the elongated body to facilitate bending and twisting of the flexible neck and to retain the broadband router in a selected positional relationship between the base and the broadband router. The flexible neck may have a dampener for dampening movement of the flexible neck. The dampener may be a flexible conduit extending substantially uninterrupted between the first end and the second end of the elongated neck.

According to some disclosed embodiments, a first swivel is attached to the first end of the flexible neck and a second swivel attached to the second end of flexible to facilitate rotational movement of the outwardly-facing member about the flexible elongated neck.

According to some disclosed embodiment, the base comprises terminals adapted for connection to an electrical power outlet. The base may comprise an ethernet port adapted for connection to an ethernet. The base may comprise a USB port adapted to receive a USB device.

The flexible neck is bent and adjusted to position the broadband router in proximity to a window and oriented to point to the base station.

According to disclosed embodiments, a broadband wireless device comprises a broadband router comprising a first transceiver configured to receive millimeter wave band downlink signals from a radio base station and to transmit sub-7 GHz band uplink signals to the radio base station and a second transceiver configured to receive sub-7 GHz band signals from a communication device and to transmit sub-7 GHz band signals to the communication device. The wireless device comprises a base and a flexibile neck having an elongated body and a first end connected to the broadband router and a second end connected to the base. The flexible neck bends and twists with ease. The flexible neck supports and retains the broadband router in a selected position in relation to the base. The flexible neck provides a pathway for electrically connecting the broadband router to the base to supply electrical power to the broadband router. The flexible neck also provides a pathway for a conductor to transfer data signals between the base and the broadband router.

According to disclosed embodiments, a broadband wireless device comprises a broadband router comprising a first transceiver configured to receive millimeter wave band downlink signals from a radio base station and to transmit millimeter wave band uplink signals to the radio base station and a second transceiver configured to receive sub-7 GHz band signals from a communication device and to transmit sub-7 GHz band signals to the communication device. The wireless device comprises a base and a flexible neck having an elongated body and a first end connected to the broadband router and a second end connected to the base. The flexible neck bends and twists with ease. The flexible neck supports and retains the broadband router in a selected position in relation to the base. The flexible neck provides a pathway for electrically connecting the broadband router to the base to supply electrical power to the broadband router. The flexible neck may provide a pathway for a conductor to transfer data signals between the base and the broadband router.

DETAILED DESCRIPTION

Figure 1:
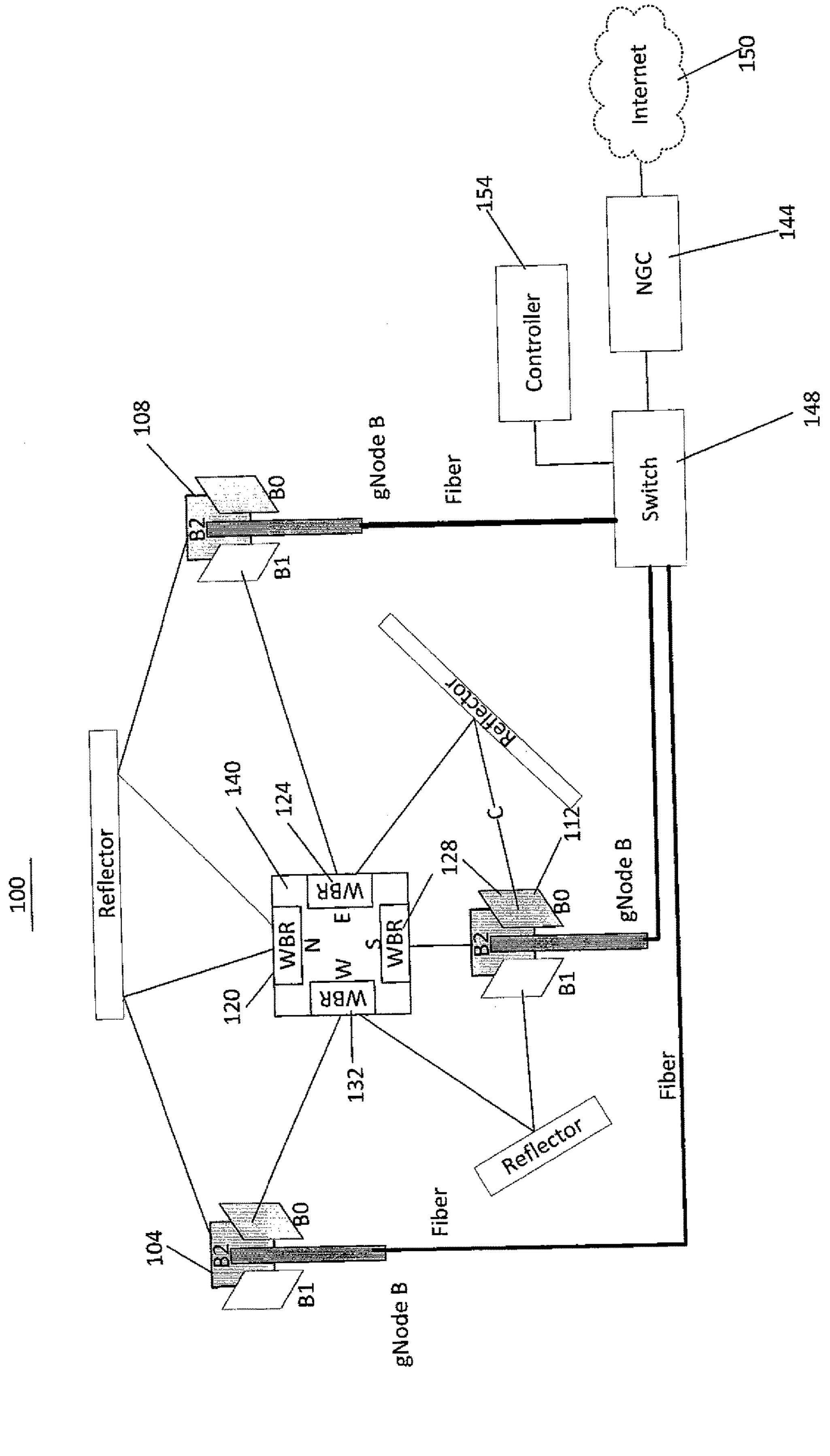
FIG. 1 illustrates an exemplary wireless network in accordance with disclosed embodiments.

FIG. 1 illustrates a wireless network 100 in accordance with disclosed embodiments. The network 100 includes radio base stations 104, 108 and 112 (also referred to as gNodeBs) that wirelessly communicate with wireless broadband routers (WBR) 120, 124, 128 and 132 installed inside a residential or a commercial building 140.

According to disclosed embodiments, each radio base station implements a plurality of sectors. For example, the base stations 104, 108 and 112 each comprise three sectors, B0, B1 and B2. The radio base stations 104, 108 and 112 are connected to a network 144 via a switch or router 148. The network 144 may be connected to the Internet 150. The radio base stations also communicate control messages with a controller 154. The wireless broadband routers 120, 124, 128, and 132 provide high-speed Internet access to communication devices inside the residential or commercial building 140. The communication devices may, for example, be smartphones, wearable devices, laptop computers, desktop computers, augmented reality/virtual reality (AR/VR) devices or any other communication devices.

Referring to FIG. 1, when the wireless broadband router (WBR) is facing North, it receives signals from sector B2 of the radio base stations 104 as well as from sector B2 of the radio base station 108. In both these wireless links, there is no direct path and the received signals follow a reflected non-line-of-sight (NLOS) path. When the wireless broadband router is facing East, it receives a reflected NLOS signal from sector B0 of radio base stations 112 and a direct signal from sector B1 of radio base station 108. When the wireless broadband router is facing South, it receives a direct signal from sector B2 of radio base station 112. When the wireless broadband router (WBR) is facing West, it receives a direct signal from sector B0 of radio base station 104 and a reflected NLOS signal from sector B1 of radio base station 112.

Referring to FIG. 1, the controller 154 exchanges control messages with the radio base stations 104, 108 and 112. The Controller 154 also exchanges control messages with the wireless broadband routers 120, 124. 128 and 132 via one or more of the radio base stations. These control messages may include received signal strengths reports for the base stations/sectors/beams that the wireless broadband routers can measure, as well as commands for the wireless broadband routers to perform certain tasks.

Figure 2:
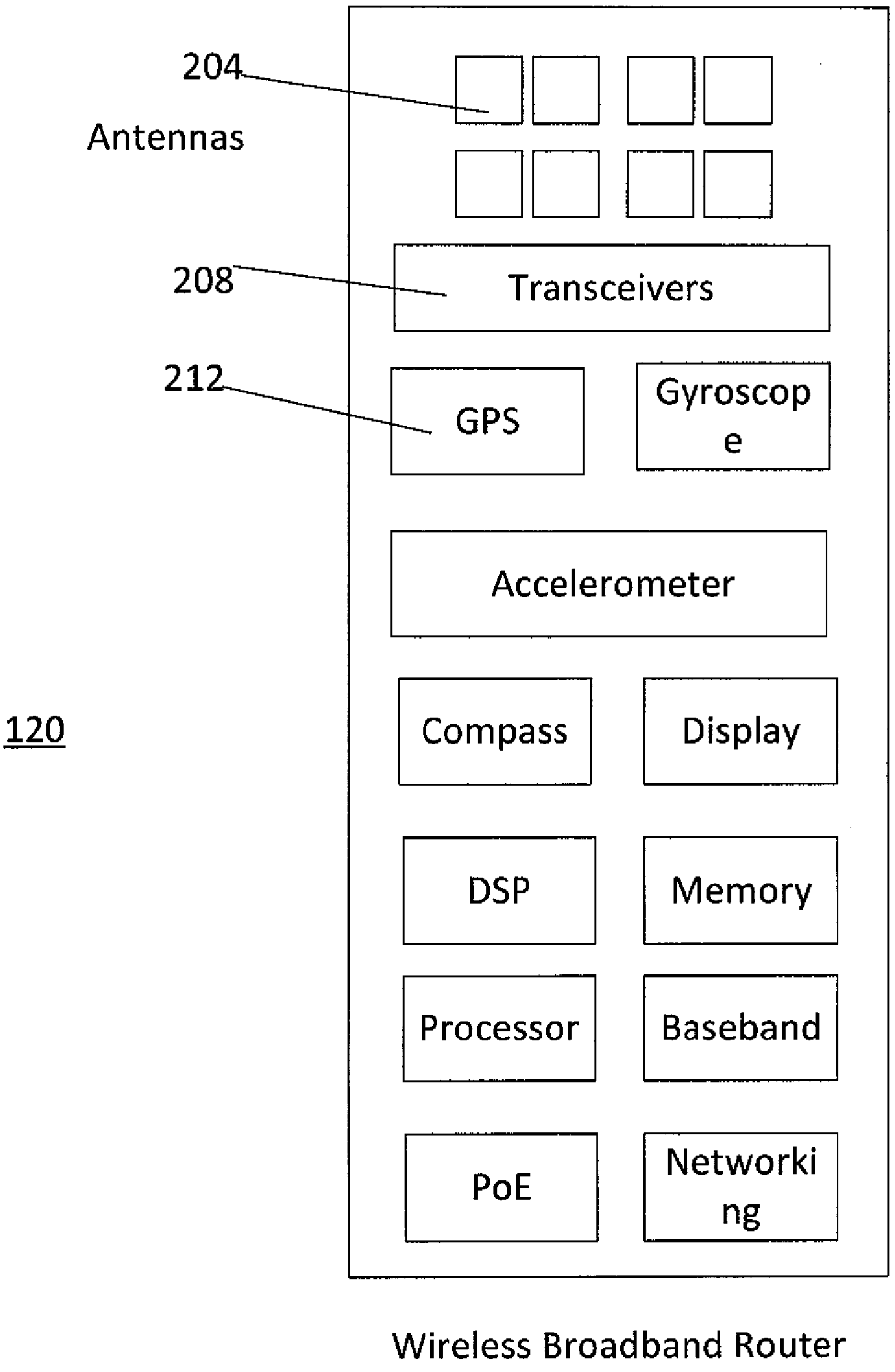
FIG. 2 illustrates functions implemented by a wireless broadband router.

FIG. 2 illustrates the functions implemented by the wireless broadband router 120 according to some disclosed embodiments. The wireless broadband router 120 comprises a plurality of antenna arrays 204. According to some disclosed embodiments, the antenna arrays 204 comprise a first antenna array configured to receive millimeter wave band downlink signals from a base station and a second antenna array configured to transmit millimeter wave band uplink signals to the base station. In other embodiments, a single antenna array may be configured to both receive and transmit millimeter wave band uplink and downlink signals. In yet other embodiments, the second antenna array may be configured to transmit sub-7 GHz uplink signals to the base station, in which case the wireless broadband router 120 is configured to transmit and receive widely spaced uplink and downlink signals, i.e., receive millimeter wave band downlink signals and transmit sub-7 GHz band uplink signals. The antenna arrays 204 comprise a third antenna array to transmit sub-7 GHz signals to a communication device and a fourth antenna array to receive sub-7 GHz signals from the communication device.

The wireless broadband router 120 comprises transceivers 208 that transmit data and control signals to the radio base station (e.g., 104, 108, or 112) and receives data and control signals transmitted by the radio base station. The transceivers 208 may comprise a first transceiver configured to receive millimeter wave band downlink signals from the base station and transmit uplink signals to the base station. The uplink signals may be millimeter wave band uplink signals or sub-7 GHz band uplink signals. The transceivers 208 may comprise a second transceiver configured to transmit sub-7 GHz band signals to the communication device and configured to receive sub-7 GHz band signals from the communication device.

The wireless broadband router 120 comprises a receiver 212 for satellite based positioning such as a GPS receiver and antenna that are used to determine the location of the wireless broadband router. The location information can be further refined by using other location methods such as cellular and Wi-Fi based location services. The wireless broadband router may also utilize various sensors such as a gyroscope, an accelerometer and a compass. The signals from these sensors are used to determine the orientation of the broadband router and may serve to associate the performance of the wireless link with a specific orientation. This will allow the system to provide users with indications regarding possible movements in the orientation, which may be the cause for performance degradation. The capability to read orientation may also serve to guide users towards a direction in which the multi-gNodeB base station system can provide the highest reliability. Such orientation may be chosen such that multiple gNodeB base station may offer acceptable coverage, rather than being chosen such that one particular gNodeB base station is received at a maximal signal level. The other functions implemented by the wireless broadband router 120 include baseband processing, digital signal processing, communications protocol processing, memory, networking and routing functions. The wireless broadband router 120 may also include additional functionalities such as a display and a camera.

Figure 3:
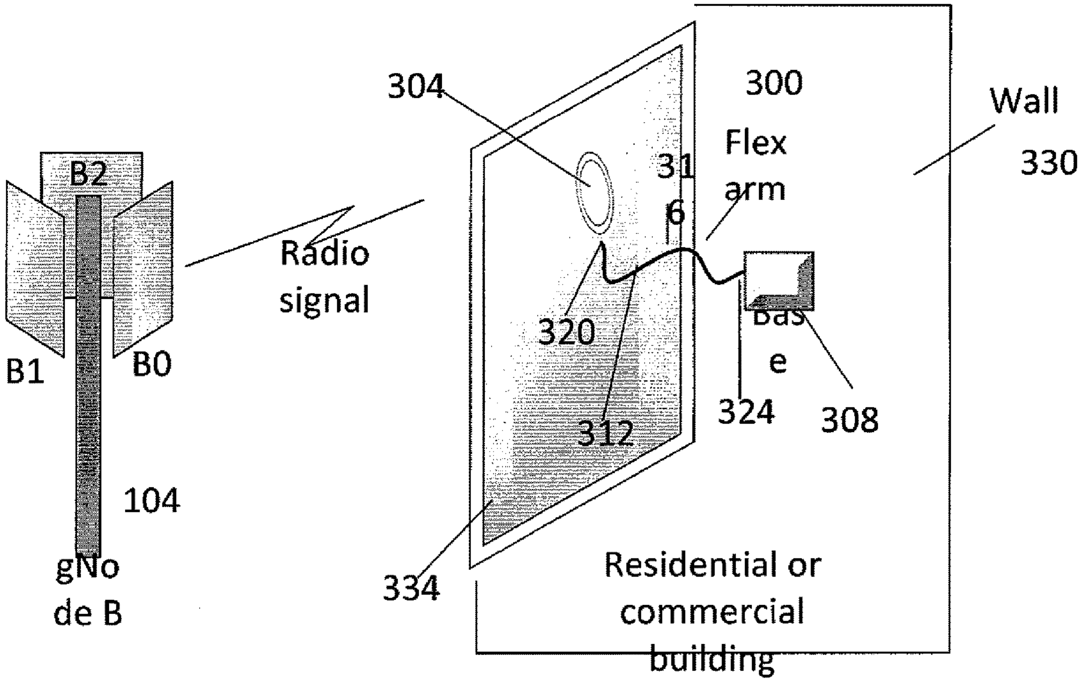
FIG. 3 illustrates a broadband wireless device according to disclosed embodiments.

FIG. 3 illustrates a broadband wireless device 300 according to disclosed embodiments. The broadband wireless device 300 may be installed inside a residential building or a commercial building. In other embodiments, the wireless device 300 may be installed outdoors. The wireless device 300 comprises a broadband router 304 which includes first and second transceivers (not shown in FIG. 3). A flexible neck 312 connects the broadband router 304 to a base 308. The base 308 includes terminals configured to be removably-attached or plugged into a conventional electrical outlet (e.g., wall electrical outlet). The base 308 may be constructed from any conventional material, such as metal or plastic.

The flexible neck 312 has an elongated body 316 that bends and twists with ease. The flexible neck 312 has a first end 320 connected to the broadband router 304 and a second end 324 connected to the base 308. The means of attachment of the flexible neck 312 to the base 308 and to the broadband router 308 may be any conventional means, such as, for example, bolt, nut and bolt combination, screw, swivel means. The flexible neck 312 supports and retains the broadband router 304 in a selected position in relation to the base 308. The flexible neck 312 may be made from any conventional material, such as, for example, coiled plastic, coiled metal or steel mesh.

According to some disclosed embodiments, the flexible neck 312 has a plurality of parallel grooves formed laterally about the outer surface of the elongated body 316 to facilitate bending and twisting of the flexible neck 312. When the flexible neck 312 is bent or twisted to change the position of the broadband router 304, the flexible neck 312 retains the broadband router 304 in a selected positional relationship relative to the base 308.

According to some disclosed embodiments, the flexible neck has a dampener for dampening movement of the flexible neck. In some embodiments, the dampener is a flexible conduit extending substantially uninterrupted between the first end 320 and the second end 324 of the elongated neck 316.

According to some disclosed embodiments, the flexible neck 312 comprises a first swivel (not shown in FIG. 3) attached to the first end 320 and a second swivel (not shown in FIG. 3) attached to the second end 324 to facilitate rotational movement of the broadband router 304 about the flexible neck. Thus, by bending the flexible neck 312 and rotating the broadband router 304, the router 304 can be moved to a desired position.

Referring to FIG. 3, the wireless device 300 is installed by plugging the base 308 into an electrical outlet of an interior wall 330 of a residential or a commercial building. The flexible neck 312 is bent and adjusted and the broadband router 304 is rotated to position in close proximity to a window 334. For optimal performance, the broadband router 304 is positioned in close proximity to the window 334 and oriented to point towards the radio base station 104. Since millimeter wave band signals generally degrade during outdoor to indoor and indoor to outdoor penetration, by positioning the broadband router 304 in close proximity to the window 334 and oriented to point toward the base station 104, the broadband router 304 can receive millimeter wave band downlink signals with less degradation from the base station 104. For the same reasons, the broadband router 304 can transmit uplink signals to the base station 104. The broadband router 304 may be configured to transmit sub-7 GHz band or millimeter wave band uplink signals.

The flexible neck 312 provides a pathway for electrically connecting the broadband router to the base to supply electrical power to the broadband router. The flexible neck 312 also provides a pathway for a conductor to transfer data signals between the base and the broadband router. In some embodiments, the flexible neck 312 provides a pathway for an ethernet cable to supply electrical power to the broadband router 304 and to transfer data signals between the broadband router 304 and the base 308. The base 308 comprises terminals adapted for connection to an electrical power outlet. The base 308 may include an ethernet port adapted for connection to an ethernet and may include a USB port adapted to receive a USB device.

Figure 4:
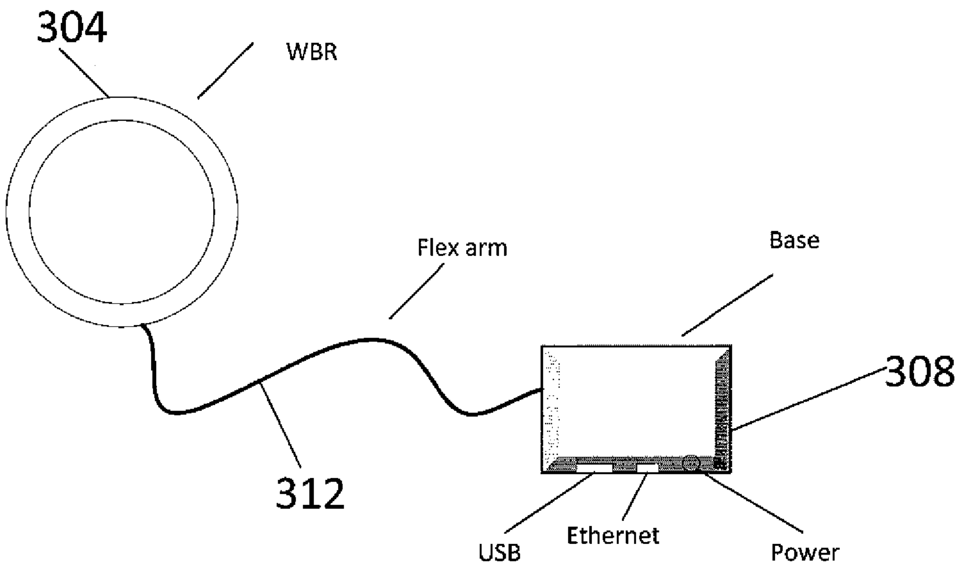
FIG. 4 illustrates a broadband router being supported by a flexible neck 312.

FIG. 4 illustrates the broadband router 304 being supported by the flexible neck 312. The flexible neck 312 can be bent and the broadband router can be rotated to move the broadband router to a desired position. The flexible neck 312 retains the broadband router 304 in a selected position in relation to the base 308. As discussed before, the broadband router 304 can be moved in close proximity to the window and pointed toward the base station. The base station 308 may include terminals for connection to an electrical outlet, and may include an ethernet port and a USB port.

Figure 5:
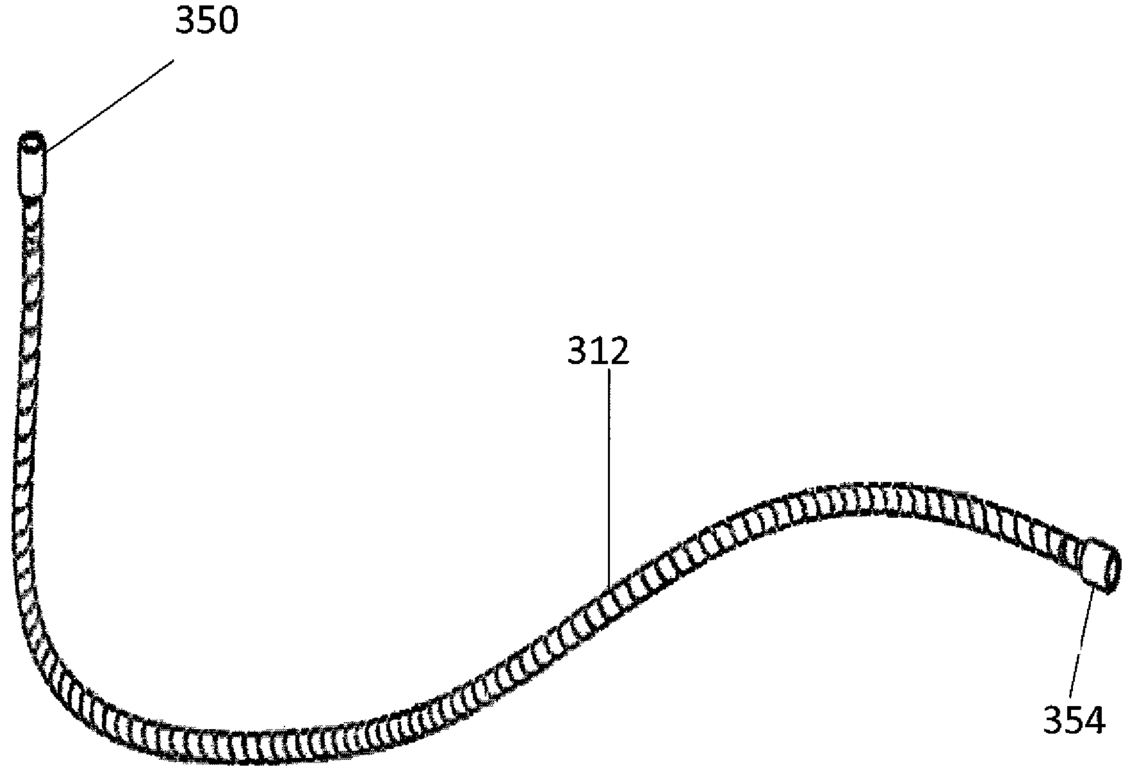
FIG. 5 illustrates a flexible neck according to some disclosed embodiments.

FIG. 5 illustrates the flexible neck 312 according to some disclosed embodiments. The flexible neck 312 may be made of spring, coiled metal, coiled plastic or steel mesh that bends and twists with ease and retains a selected shape. The flexible neck 312 includes attachment means 350 and 354 to connect the flexible neck 312 to the broadband router 304 and to the base 308. The attachment means 350 and 354 may be any conventional means, such as, for example, bolt, nut and bolt combination, screw, swivel means.

According to disclosed embodiments, the broadband router 304 may have a circular shape, a rectangular shape, a square shape or any other shapes.

Those skilled in the art will recognize that, for simplicity and clarity, the full structure and operation of all systems suitable for use with the present disclosure are not being depicted or described herein. Instead, only so much of a system as is unique to the present disclosure or necessary for an understanding of the present disclosure is depicted and described. The remainder of the construction and operation of the disclosed systems may conform to any of the various current implementations and practices known in the art.

Those skilled in the art will recognize that, unless specifically indicated or required by the sequence of operations, certain steps in the processes described above may be omitted, performed concurrently or sequentially, or performed in a different order. Further, no component, element, or process should be considered essential to any specific claimed embodiment, and each of the components, elements, or processes can be combined in still other embodiments.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

The invention claimed is:

1. A wireless device, comprising:

a broadband router comprising:

first and second transceivers;

a base; and a flexible neck having an elongated body and a first end connected to the broadband router and a second end connected to the base, wherein the flexible neck supports and retains the broadband router in a selected position in relation to the base, and wherein the flexible neck provides a pathway for electrically connecting the broadband router to the base to supply electrical power to the broadband router.

2. The wireless device of claim 1, wherein the flexible neck provides a pathway for a conductor to transfer data signals between the base and the broadband router.

3. The wireless device of claim 1, wherein the flexible elongated neck provides a pathway for an ethernet cable to supply electrical power to the broadband router and to transfer data signals between the broadband router and the base.

4. The wireless broadband device of claim 1, wherein the first transceiver is configured to receive millimeter wave band downlink signals from a radio base station and to transmit sub-7 GHz band uplink signals to the radio base station.

5. The wireless broadband device of claim 1, wherein the first transceiver is configured to receive millimeter wave band downlink signals from a radio base station and to transmit millimeter wave band uplink signals to the radio base station.

6. The wireless broadband device of claim 1, wherein the second transceiver is configured to receive sub-7 GHz band signals from a communication device and to transmit sub-7 GHz band signals to the communication device.

7. The wireless broadband device of claim 1, wherein the flexible neck has a plurality of parallel grooves formed laterally about the outer surface of the elongated body to facilitate bending of the flexible neck and to retain the broadband router in a selected positional relationship between the base and the broadband router.

8. The wireless broadband device of claim 1, wherein the flexible neck has a dampener for dampening movement of the flexible neck.

9. The wireless broadband device of claim, 1 wherein the dampener is a flexible conduit extending substantially uninterrupted between the first end and the second end of the elongated neck.

10. The wireless broadband device of claim 1, further comprising a first swivel attached to the first end of the flexible neck and a second swivel attached to the second end of flexible to facilitate rotational movement of the outwardly-facing member about the flexible elongated neck.

11. The wireless broadband device of claim 1, wherein the base comprises terminals adapted for connection to an electrical power outlet.

12. The wireless broadband device of claim 1, wherein the base comprises an ethernet port adapted for connection to an ethernet.

13. The wireless broadband device of claim 1, wherein the base comprises a USB port adapted to receive a USB device.

14. The wireless broadband device of claim 1, wherein the broadband router is positioned in proximity to a window facing outward.

15. A wireless device, comprising:

a broadband router comprising:

a first transceiver configured to receive millimeter wave band downlink signals from a radio base station and to transmit sub-7 GHz band uplink signals to the radio base station;

a second transceiver configured to receive sub-7 GHz band signals from a communication device and to transmit sub-7 GHz band signals to the communication device;

a base; and a flexible neck having an elongated body and a first end connected to the broadband router and a second end connected to the base, wherein the flexible neck supports and retains the broadband router in a selected position in relation to the base, and wherein the flexible neck provides a pathway for electrically connecting the broadband router to the base to supply electrical power to the broadband router.

16. The wireless device of claim 15, wherein the flexible neck provides a pathway for a conductor to transfer data signals between the base and the broadband router.

17. The wireless device of claim 15, wherein the flexible elongated neck provides a pathway for an ethernet cable to supply electrical power to the broadband router and to transfer data signals between the broadband router and the base.

18. The wireless broadband device of claim 15, wherein the flexible neck comprises a plurality of parallel grooves formed laterally about the outer surface of the elongated body to facilitate bending of the flexible neck and to retain the broadband router in a selected positional relationship between the base and the broadband router.

19. The wireless broadband device of claim 15, further comprising a first swivel attached to the first end of the flexible neck and a second swivel attached to the second end of flexible to facilitate rotational movement of the broadband router about the flexible elongated neck.

20. The wireless broadband device of claim 15, wherein the base comprises terminals adapted for connection to an electrical power outlet.

21. The wireless broadband device of claim 15, wherein the base comprises an ethernet port adapted for connection to an ethernet.

22. The wireless broadband device of claim 15, wherein the base comprises a USB port adapted to receive a USB device.

23. The wireless broadband device of claim 15, wherein the broadband router is positioned in proximity to a window facing outward.

24. A wireless device, comprising:

a broadband router comprising:

a first transceiver configured to receive millimeter wave band downlink signals from a radio base station and to transmit millimeter wave band uplink signals to the radio base station;

a second transceiver configured to receive sub-7 GHz band signals from a communication device and to transmit sub-7 GHz band signals to the communication device;

a base; and a flexible neck having an elongated body and a first end connected to the broadband router and a second end connected to the base, wherein the flexible neck supports and retains the broadband router in a selected position in relation to the base, and wherein the flexible neck provides a pathway for electrically connecting the broadband router to the base to supply electrical power to the broadband router.

25. The wireless device of claim 24, wherein the flexible neck provides a pathway for a conductor to transfer data signals between the base and the broadband router.

26. The wireless device of claim 24, wherein the flexible elongated neck provides a pathway for an ethernet cable to supply electrical power to the broadband router and to transfer data signals between the broadband router and the base.

27. A wireless device configured to point to a radio base station, comprising:

a broadband router comprising:

a first transceiver configured to receive millimeter wave band downlink signals from the radio base station and to transmit uplink signals to the radio base station;

a second transceiver configured to receive sub-7 GHz band signals from a communication device and to transmit sub-7 GHz band signals to the communication device;

a base; and a flexible neck having an elongated body and a first end connected to the broadband router and a second end connected to the base, wherein the flexible neck supports and retains the broadband router in a selected position in relation to the base, and wherein the flexible neck provides a pathway for electrically connecting the broadband router to the base to supply electrical power to the broadband router.

28. The wireless device of claim 27, wherein the flexible neck provides a pathway for a conductor to transfer data signals between the base and the broadband router.

29. The wireless device of claim 27, wherein the flexible elongated neck provides a pathway for an ethernet cable to supply electrical power to the broadband router and to transfer data signals between the broadband router and the base.

30. The wireless device of claim 27, wherein the uplink signals transmitted to the base station is in sub-7 GHz band.

31. The wireless device of claim 27, wherein the uplink signals transmitted to the base station is in millimeter wave band.

* * * * *